Patented Oct. 11, 1938

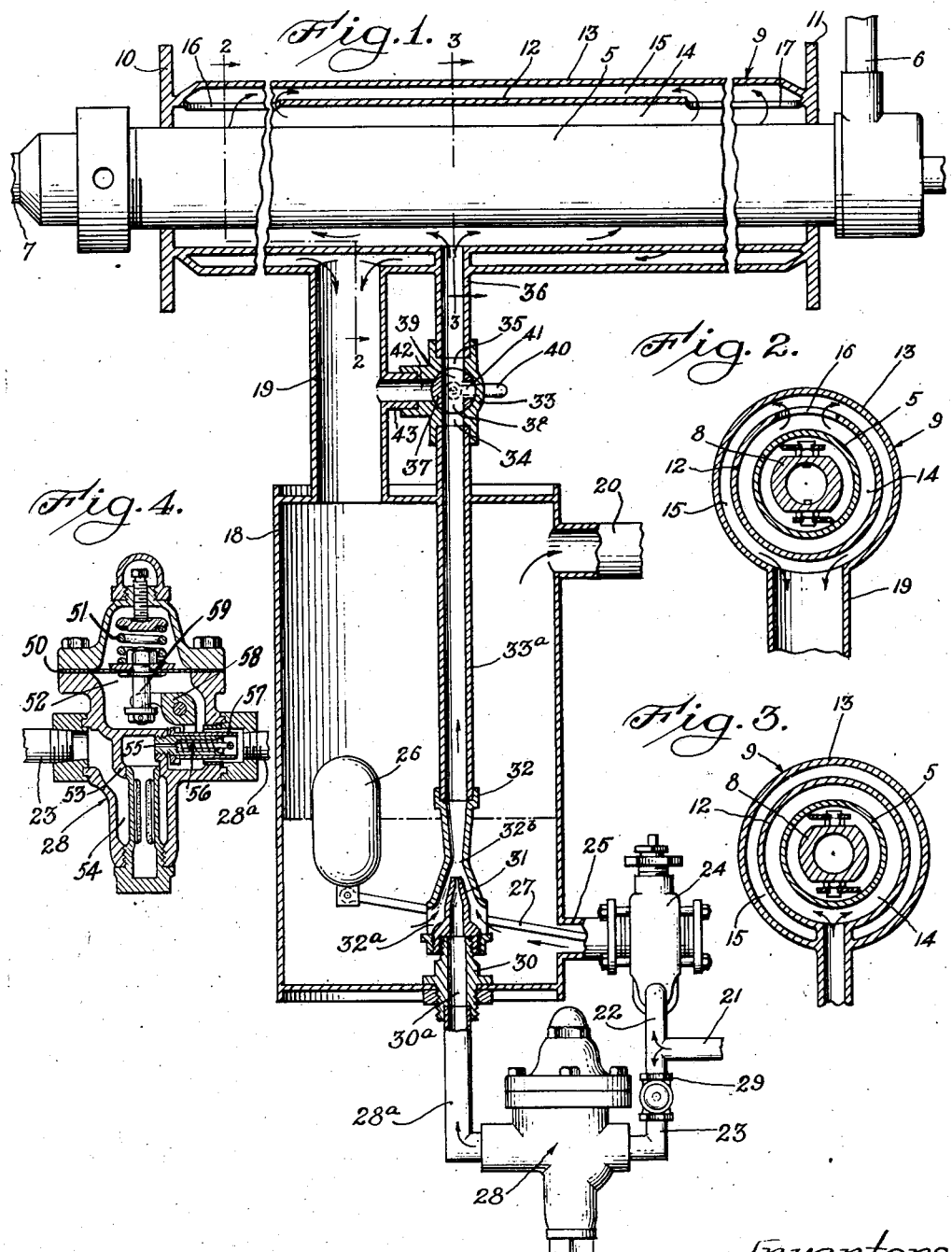

2,132,932

UNITED STATES PATENT OFFICE 2,132,932

REFRIGERATING SYSTEM

Arthur H. Boileau and Albert L. Voggenthaler, Cedar Rapids, Iowa, assignors to Cherry-Burrell Corporation, Cedar Rapids, Iowa, a corporation of Delaware Application April 20, 1936, Serial No. 75,370

24 Claims. (Cl. 62—114)

This application is a continuation in part of our copending application, Serial No. 64,291, filed February 17, 1936.

This invention relates to that type of refrigerating apparatus which, when in operation, has the volatile refrigerant liquid continuously delivered from a supply vessel to an evaporating chamber in heat interchanging relationship to the material to be refrigerated, and the surplus unevaporated liquid returned to the supply vessel.

One object of the present invention is to provide simple, effective and improved means for delivering the refrigerant upwardly from the supply vessel to the refrigerating chamber disposed at a higher elevation, whereby, when it is desired to stop the refrigerating action, the supply to said chamber may be shut off and the unevaporated refrigerant in said chamber may be permitted to quickly flow by gravity back to the supply vessel.

As one feature of our invention the conduit for delivering the liquid from the supply vessel to the refrigerating chamber is provided with flow inducing means which is not a positive displacement pump but is of such a type that when its operation is stopped free return flow may take place through the same pipe and past the flow inducing means to the supply chamber below the liquid level in the latter, and without the necessity for any by-pass or auxiliary valves.

As a further feature the flow inducing means is in the form of an injector having a nozzle through which refrigerant fluid is delivered from a high pressure source, and the supply chamber is of such capacity and is so positioned in respect to the refrigerating chamber that it will receive all of the unevaporated refrigerant from the refrigerating chamber when the flow from the accumulator to said chamber is stopped.

As a further feature there is provided a valve mechanism which may be easily and quickly operated to establish communication between the lower portion of the refrigerating chamber and the upper portion of the supply chamber to permit almost instantaneous drainage of all unevaporated liquid from the refrigerating chamber when it is desired to stop the refrigerating action.

As a further feature the valve mechanism is located in the delivery conduit from the supply vessel to the refrigerating chamber so that it will also operate to stop the flow to the refrigerating chamber, even though the injector or other flow inducing means continues in operation.

As a further feature the accumulator is mounted directly beneath and closely adjacent to the evaporator, so that the delivery conduit may be a straight, vertical one, with only a comparatively short section outside of the walls of the accumulator, and the ejector is disposed within the accumulator so that there is the minimum resistance to the upflow, the minimum number of joints and packings liable to leakage, and the minimum loss of refrigeration effect through heat absorption in the connecting piping.

As a further feature the evaporator includes two concentric casings encircling the chamber to be refrigerated, and communicating at the top, the refrigerant being delivered to the inner casing and withdrawn from the bottom of the outer one, whereby the gas resulting from the evaporation in the inner casing and the surplus liquid delivered to the inner casing, in flowing downwardly in the outer casing, acts to precool the liquid in the inner casing and as an insulation to prevent heat absorption from the outside atmosphere to the refrigerant in the inner casing which is in heat interchanging relationship with the chamber to be refrigerated.

The volume of output from an ejector is responsive to the pressure and volume of flow from the nozzle thereof and this is responsive to the input pressure on the nozzle. Hence a further object of our invention is to maintain a predetermined input pressure on the nozzle of an ejector to thereby maintain the pressure and volume of flow from the nozzle constant and thereby effect a predetermined volume of flow from the ejector.

A still further object is to maintain a predetermined input pressure on the nozzle of an injector notwithstanding variations of the pressure of the source of supply, and to accomplish this object we employ an automatic pressure reducing valve intermediate the source of supply and the nozzle of the ejector to maintain a predetermined input pressure on the nozzle.

A selected embodiment of our invention is illustrated in the accompanying drawing wherein Fig. 1 is a vertical sectional view of a refrigerating apparatus embodying our invention;

Fig. 2 is a transverse sectional detail view taken substantially on the line 2—2 on Fig. 1;

Fig. 3 is a sectional detail view taken substantially on the line 3—3 on Fig. 1; and Fig. 4 is a vertical sectional detail view of one type of pressure reducing valve employed in the invention.

We show the preferred form of our invention in the accompanying drawing in association with a cylinder 5 providing a freezing chamber to which an inlet pipe 6 and an outlet pipe 7 are connected. Material to be frozen, such as an ice cream mix, is passed into the cylinder 5 from the pipe 6 and as it passes through the cylinder 5 it is frozen while being agitated by suitable means 8. Agitating means suitable for use in this invention are described in the Boileau Patent 1,962,386, patented June 12, 1934, but it is to be understood that any other suitable means might be employed. We have illustrated and described a freezing chamber of this kind for the purpose of illustrating a use of our invention and it is to be understood that our invention is not limited to such usage.

A housing, generally indicated by 9, is provided about the cylinder 5 and includes end plates 10 and 11. A cylinder 12 extends between the end plates 10 and 11 in spaced relation with the periphery of the cylinder 5 and another cylinder 13 is provided outwardly of the cylinder 12 and likewise extends between the end plates 10 and 11. The cylinder 12 in cooperation with the periphery of the cylinder 5 provides a refrigerating chamber 14 and the cylinder 13 in cooperation with the cylinder 12 provides a refrigerant return chamber 15. Openings 16 and 17 are provided at opposite ends of the cylinder 12 on the upper side thereof to provide communication between the refrigerating chamber 14 and the refrigerant return chamber 15. An accumulator or liquid supply vessel 18 is mounted below the housing 9 and a refrigerant return pipe 19 extends from the lower part of the refrigerant return chamber 15 through the top of the accumulator 18 whereby refrigerant flowing through the openings 16 and 17 into the chamber 15 may be returned to the accumulator 18. A pipe 20 leads from the upper part of the accumulator 18 to the suction side of suitable refrigerating apparatus (not shown) which may consist of a compressor and condenser and like mechanism as is well understood in the art.

A refrigerant supply pipe 21 leads from the aforesaid refrigerating apparatus and terminates in two oppositely extending branch pipes 22 and 23 so disposed that the pipes 21, 22 and 23 are arranged in T-shape formation.

The branch pipe 22 leads to a float controlled valve 24 which has an outlet pipe 25 leading therefrom into the lower part of the accumulator 18. An operating arm 27 extends through the pipe 25 and has a float 26 mounted at the free end thereof. Refrigerant admitted into the accumulator 18 through the valve 24 collects in the lower part of the accumulator and the float 26 is moved upwardly as the quantity of refrigerant in the accumulator 18 increases, until the float 26 acts through the arm 27 to close the valve 24 and prevent further admission of refrigerant into the accumulator. When the quantity of refrigerant stored in the accumulator 18 is reduced, the float 26 opens the valve 24 to again admit refrigerant into the accumulator 18.

The branch pipe 23 leads to the inlet side of a suitable pressure reducing valve, generally indicated by 28, which in the present instance is of the expansion type. A hand valve 29 is provided in the pipe 23 to control flow to the inlet side of the valve 28. One suitable construction for the valve 28 is illustrated in Fig. 4 but it is to be understood that other constructions might be employed without departing from the purview of our invention. In the form shown there is provided a diaphragm 50 having an adjustable spring 51 pressing it inwardly against the fluid pressure in the chamber 52 communicating with the outlet pipe 28a. A partition 53 separates the chamber 52 from a chamber 54 communicating with the inlet pipe 23 and in this partition is a port 55 controlled by a valve 56 connected to a sleeve 57. A bell crank lever 58 is mounted in the chamber 52 with one end engaging a stop on a stud 59 carried by the diaphragm 50 and the other end engaging a flange on the sleeve. When the pressure in the delivery pipe 28a and the chamber 52 decreases, the spring 51 forces the diaphragm inwardly and the pressure in the chamber 54 acting on the valve 56 opens the latter. As the pressure in the chamber 52 increases, it acts on the diaphragm to swing the bell crank lever clockwise and force the valve toward its seat. As the port 55 is small and the diaphragm relatively large, the pressure maintained in the chamber 52 and the outlet pipe 28a may be substantially constant, but this may be adjusted at will by adjusting the tension of the spring 51. The valve 28 so operates that refrigerant at a predetermined pressure is admitted into the outlet pipe 28a of the valve irrespective of variations in the pressure of refrigerant in the pipes 21, 22 and 23.

A fitting 30 is mounted in the bottom wall of the accumulator 18 and the pipe 28a is connected thereto. A nozzle 31 is mounted on the fitting 30 in the accumulator 18 and refrigerant flowing through the pipe 28a passes through the bore 30a in the fitting 30 to flow through the restricted outlet of the nozzle 31.

The lower end of a throat 32 is mounted on the nozzle 31 so as to be supported by the fitting 30 and has openings 32a in the lower end thereof. The interior of the throat 32 is inversely tapered and the apices of the inverse tapers define a restricted part 32b in the throat that is positioned immediately above the outlet of the nozzle 31. The float 26 acts to maintain a supply of refrigerant in the accumulator 18 at a level above the openings 32a.

Refrigerant emitted from the restricted outlet of the nozzle 31 in passing through the throat 32 withdraws refrigerant from the supply thereof in the accumulator 18 through the openings 32a and forces it through the pipe 33a to the refrigerating chamber 14. A portion of the liquid refrigerant passing through the nozzle 31 flashes into gas and thereby drops in temperature. It therefore cools the liquid which is drawn in from the accumulator through the openings 32a and the gas and cooled liquid in turn cool the body of refrigerant liquid in the accumulator 18. The liquid refrigerant delivered to the refrigerating chamber is precooled not only by the flashing of liquid into gas at the ejector, but also by the return gas from the refrigerating chamber in the upper part of the accumulator.

Valve means are provided whereby the refrigerating action in the chamber 14 may be terminated almost instantly when desired. This may operate to permit rapid draining of the unevaporated liquid from the chamber 14 and to stop the further delivery of liquid to said chamber. This is illustrated as a valve 33 in the conduit 33a. The valve 33 includes a port 34 into which the pipe 33a opens and another port 35 is positioned in diametrical relation with respect to the port 34. A pipe 36 extends from the port 35 through the walls of the cylinders 12 and 13 and opens into the refrigerating chamber 14. A valve member 37 is provided in the valve 33 and includes aligned intercommunicating gates 38 and 38 and a handle 40 is connected to this valve member. When the handle 40 is disposed in a position to extend at right angles to the aligned pipes 33a and 36, the aligned gates 38 and 39 respectively communicate with the ports 34 and 35 whereby refrigerant flowing through the pipe 33a passes through the gates 38 and 39, port 35 and pipe 36 into the refrigerating chamber 14 to set up a refrigerating action therein.

The valve member 38 includes a gate 41 which extends at right angles to the aligned gates 38 and 39 preferably in alignment with the handle 40. A port 42 is provided in the valve 33 which extends therefrom at right angles to the ports 34 and 35. A pipe 43 extends between the port 42 and the return pipe 19.

When the handle 40 is moved counterclockwise from the position shown in Fig. 1 into parallelism with the pipe 36, the gate 41 communicates with the port 35. The solid part of the valve member 37 closes off flow from the pipe 33a and the gate 38 is disposed in the position in which the gate 41 is shown in Fig. 1. When the valve member 37 is arranged in this position flow from the pipe 33a into the refrigerating chamber 14 is closed off and the refrigerant in said chamber may drain back through pipe 36, port 35, gate 41, gate 39, port 42 and pipe 43 into the return pipe 19 to flow back into the accumulator 18.

The nozzle 31 is so sized that when refrigerant at a predetermined pressure is supplied to the nozzle a predetermined quantity of refrigerant will be emitted from the nozzle in such a way that a predetermined quantity of refrigerant stored in the accumulator 18 will be picked up and supplied to the refrigerating chamber 14. Thus by supplying refrigerant at a predetermined pressure to the nozzle 31 a predetermined quantity of refrigerant may be supplied to the refrigerating chamber 14, and this enables close control of the refrigerating action in said refrigerating chamber. Therefore the pressure reducing valve 28 is set to deliver refrigerant to the pipe 28a at a predetermined pressure and this valve automatically operates in the manner well understood in the art to maintain this pressure in the pipe 28a and therefore the input pressure on the nozzle 31.

The float 26 will act to maintain a predetermined quantity of refrigerant in the accumulator 18. Thus when it is desired to set the apparatus in operation the hand valve 29 is opened whereupon refrigerant passes through the pipe 23 into the valve 28 and refrigerant at a predetermined pressure is admitted into the pipe 28a and nozzle 31. This refrigerant is emitted from the restricted outlet of the nozzle 31 and picks up refrigerant admitted into the throat 32 through the openings 32a and forces this refrigerant through the valve 33 into the refrigerating chamber 14, said valve being arranged during this operation in the position shown in Fig. 1. Refrigerant evaporated in the refrigerating chamber 14 passes through the openings 16 and 17 into the return chamber 15 and thence through the return pipe 19 to the accumulator 18. Vaporized refrigerant is withdrawn from the accumulator 18 through the suction pipe 20. Any liquid refrigerant passing into the return chamber 15 flows through the pipe 19 to be returned to the supply of refrigerant maintained in the accumulator 18.

When the hand valve 29 is closed supply of refrigerant to the nozzle 31 is interrupted and this interrupts ejection of refrigerant to the pipe 33a and therefore the refrigerating chamber 14. When this is effected the handle 40 is moved into alignment with the pipe 36 whereupon any refrigerant in the chamber 14 drains back into the pipe 19 and accumulator 18. Therefore the refrigerating action may be quickly interrupted. Moreover, by positioning the handle 40 in the position shown in Fig. 1 and opening the valve 29 the refrigerating action in the chamber 14 may again be quickly set up. The float 26 operates to maintain a supply of refrigerant in the accumulator 18 above the openings 32a and this float also operates to maintain a predetermined quantity of refrigerant in the accumulator 18, that is to say, this float operates to close the valve 23 when the refrigerant stored in the accumulator 18 rises to a predetermined level.

For a short or temporary stopping of the refrigerating action the valve 33 may be operated without closing the valve 29 because a continued flow of the refrigerant through the nozzle will cause such refrigerant to flow in the reverse direction through the opening 32a into the accumulator when the port 34 is closed. As such flow through the nozzle is relatively small, it will not result in any substantial increase in the volume of liquid in the accumulator during a short period of time. Likewise, when a rapid stopping of refrigerant action is not required, it will be sufficient to merely shut the valve 29. As this will stop the upflow in the conduit 33a, the residual unevaporated liquid in the chamber 14 may flow back past the valve 33 and into the accumulator through the openings 32a without operating the valve 33.

It will be seen from the foregoing description that refrigerating action may be quickly initiated or interrupted in the refrigerating chamber 14 and that inasmuch as a predetermined input pressure is maintained on the nozzle 31 a predetermined quantity of refrigerant will be supplied to the chamber 14 whereby a predetermined refrigerating action will be set up in the refrigerating chamber. Moreover, inasmuch as the valve 28 which maintains a predetermined input pressure on the nozzle may be adjusted operation of the ejector may be varied to consequently vary the supply of refrigerant to the chamber 14 and in this way the degree of refrigerant effected in the chamber 14 may be controlled.

In plants where the pressure on the refrigerant liquid supplied through the pipe 21 is substantially constant, or where the pressure variations are relatively small, the automatic pressure regulating valve 28 may be entirely omitted. Where quick shut-down is seldom, if ever, required the valve 34 may be omitted or replaced by other types of valves. So far as certain aspects of our invention are concerned, means other than an ejector nozzle may be employed for forcing the volatile liquid refrigerant up the pipe 33a from the supply vessel 18.

While we have illustrated and described a selected embodiment of our invention it is to be understood that this is capable of variation and modification and we therefore do not wish to be limited to the precise details set forth but desire to avail ourselves of such changes and alterations as fall within the purview of the following claims:

We claim:

1. A refrigerating apparatus including a chamber to be refrigerated, and having an evaporator casing, a refrigerant storage vessel disposed at a lower elevation than said casing, and of greater total capacity than the latter, means for supplying refrigerant to said vessel, a conduit connecting the said vessel and the lowermost portion of said casing below the normal liquid level in said vessel, and means for forcing liquid refrigerant from said vessel upwardly through said conduit into said casing, whereby when said last mentioned means is not operating the liquid refrigerant may freely, rapidly and completely drain from said casing into said vessel below the liquid level in the vessel, and a passage connecting the upper portion of said casing and the upper portion of said vessel.

2. A refrigerating apparatus including a chamber to be refrigerated, and having an evaporator passage, a volatile refrigerant storage accumulator disposed at a lower elevation than said passage and of greater total capacity than the latter, means for supplying refrigerant to said accumulator, a conduit connecting the said accumulator and the lowermost portion of said passage, an ejector nozzle within said conduit, means for delivering refrigerant to said nozzle under a pressure greater than that in the accumulator, said conduit having an opening below the liquid level to permit upflow of refrigerant from said accumulator through said conduit under the action of said ejector nozzle whereby when said ejector nozzle is not in operation the liquid refrigerant may freely drain from said passage into said accumulator, and a passage connecting the upper portion of said first mentioned passage and said accumulator for the normal return of evaporated and surplus unevaporated refrigerant.

3. A refrigerating apparatus including a chamber to be refrigerated, an evaporator casing encircling said chamber, a jacket encircling said casing and communicating with the latter at the upper side and having an outlet at the lower side, a volatile refrigerant storage accumulator disposed at a lower elevation than said jacket, means for supplying refrigerant to said accumulator, a conduit connecting the said accumulator below the liquid level in the latter and said casing, means for forcing refrigerant from said accumulator upwardly into said casing, and a conduit connecting the lower portion of said jacket and said accumulator.

4. A refrigerating apparatus including a chamber to be refrigerated and having an evaporator passage, a volatile refrigerant storage chamber disposed directly beneath and closely adjacent to said passage, a vertical conduit extending from the bottom of said passage downwardly through the top of the storage chamber to a point below the normal liquid level therein, and means for inducing upward flow of refrigerant from said storage chamber through said conduit into said passage.

5. A refrigerating apparatus including a chamber to be refrigerated and having an evaporator passage, a volatile refrigerant storage chamber disposed directly beneath and closely adjacent to said passage, a vertical conduit extending from the bottom of said passage downwardly through the top of the storage chamber to a point below the normal liquid level therein, means within said storage chamber at the lower end of said conduit, for inducing upward flow of refrigerant from said storage chamber through said conduit into said passage, and a separate conduit connecting the upper portion of said passage and the upper portion of said storage chamber.

6. A refrigerating apparatus including a chamber to be refrigerated, having a pair of concentric casings encircling said chamber and the inner casing cooperating with the wall of said chamber to form a refrigerating passage and the two casings cooperating to form an outer refrigerant return passage, said passages communicating with each other at the top, a refrigerant supply vessel disposed below said chamber, a conduit connecting the lower portion of said supply vessel and said inner casing, means for forcing liquid upwardly through said conduit, and a return conduit connecting the bottom of the outer casing and the upper part of the supply vessel.

7. A refrigerating apparatus including a chamber to be refrigerated, having a pair of concentric casings encircling said chamber, the inner casing cooperating with the wall of said chamber to form a refrigerating passage and the two casings cooperating to form an outer refrigerant return passage, said passages communicating with each other at the top, a refrigerant supply vessel disposed below said chamber, a conduit connecting the lower portion of said supply vessel to said inner casing, means for forcing liquid upwardly through said conduit, a return conduit connecting the bottom of the outer casing and the upper part of the supply vessel, and a valve operable to prevent or permit drainage of unevaporated refrigerant from the bottom of the inner casing to the supply vessel.

8. A refrigerating apparatus including a chamber through which material to be refrigerated may be passed, means forming a refrigerant passage associated with said chamber, a refrigerant storage vessel disposed at a lower elevation than said passage, a conduit connecting the lower portion of said vessel with the lowermost portion of said passage, an ejector nozzle within said conduit and below the normal liquid level in said vessel for forcing liquid refrigerant from said vessel upwardly into said passage, and a passage connecting the upper portion of said first mentioned passage and the upper portion of said vessel, whereby refrigerant may be delivered upwardly from said vessel and through said first mentioned passage and may return to said vessel through said second mentioned passage, and whereby refrigerant in said first mentioned passage may completely drain into said vessel when refrigerant is not being forced from the vessel into the first mentioned passage by said ejector.

9. A refrigerating apparatus including a chamber to be refrigerated, a passage for refrigerant in heat interchanging relationship thereto, a volatile refrigerant storage accumulator disposed at a lower elevation than said passage, a conduit connecting said accumulator below the liquid level in the latter to the lowermost portion of said passage, a passage connecting the uppermost portion of said first mentioned passage and the upper portion of said accumulator, means for forcing refrigerant from said accumulator upwardly through said conduit and said first mentioned passage, and a manually operable three-way valve for permitting upflow through said conduit and said first mentioned passage or downflow from said first mentioned passage into the upper portion of said accumulator.

10. A refrigerating apparatus including a refrigerating chamber, means forming an evaporating passage in heat interchange relationship therewith, a storage vessel for volatile liquid refrigerant disposed entirely below the lower end of said passage, pressure reducing means for admitting refrigerant to said vessel, a conduit connecting the lower portion of said first mentioned passage and the lower portion of said storage vessel, an ejector for delivering refrigerant from said vessel through said conduit, means for delivering refrigerant under pressure to said ejector, a return passage connecting the upper portion of said first mentioned passage and the upper portion of said vessel, and a three-way valve connecting said conduit and said return passage, whereby the ejector may force liquid up through the conduit or its operation prevented and refrigerant may drain from said evaporating passage through said return passage to said vessel.

11. In a refrigerating apparatus, a refrigerating chamber, means for supplying refrigerant under pressure, means for storing a supply of said refrigerant, pressure-reducing means for admitting the refrigerant into the refrigerant storage means, an ejector in said refrigerant storage means and operable by refrigerant flowing from the means supplying refrigerant under pressure to withdraw refrigerant from the stored supply, means leading to the refrigerating chamber for directing refrigerant from said ejector into the refrigerating chamber, and means for returning refrigerant from the refrigerating chamber to the storage means when the refrigerating action in said chamber is to be interrupted.

12. In a refrigerating apparatus, a refrigerating chamber, means for supplying refrigerant under pressure, means for storing a supply of said refrigerant, pressure-reducing means for admitting the refrigerant into the refrigerant storage means, an ejector operable by refrigerant flowing from the means supplying refrigerant under pressure to withdraw refrigerant from the stored supply, means leading to the refrigerating chamber for directing refrigerant from said ejector into the refrigerating chamber, and means for simultaneously returning refrigerant from the refrigerating chamber to the storage means and closing off flow from the ejector into the refrigerating chamber.

13. In a refrigerating apparatus including a refrigerating chamber, a return chamber in communication with the refrigerating chamber, an accumulator wherein a supply of refrigerant may be stored, an ejector in said accumulator and operable to withdraw refrigerant from the accumulator and to force the withdrawn refrigerant into the refrigerating chamber, the refrigerant vaporized in said refrigerating chamber passing into said return chamber, return means through which refrigerant from said return chamber may flow to said accumulator, means through which vaporized refrigerant may be withdrawn from said accumulator, and means for returning liquid refrigerant from the refrigerating chamber to the return means when the refrigerating action in said chamber is to be interrupted.

14. In a refrigerating apparatus including a refrigerating chamber, a return chamber in communication with the refrigerating chamber, an accumulator wherein a supply of refrigerant may be stored, an ejector operable to withdraw refrigerant from the accumulator and to force the withdrawn refrigerant into the refrigerating chamber, the refrigerant vaporized in said refrigerating chamber passing into said return chamber, return means through which refrigerant from said return chamber may flow to said accumulator, means through which vaporized refrigerant may be withdrawn from said accumulator, and means for returning refrigerant from said refrigerating chamber to said return means and interrupting the flow of refrigerant from said ejector when the refrigerating action in said refrigerating chamber is to be interrupted.

15. In a refrigerating apparatus, a refrigerant evaporating chamber, a conduit connected therewith, an ejector for withdrawing refrigerant from a supply thereof and forcing the refrigerant through said conduit to said chamber, valve means associated with said conduit and operable to permit liquid refrigerant to drain by gravity to the supply thereof and to interrupt the flow of refrigerant to said refrigerating chamber, means for delivering a refrigerant under pressure to said ejector, and means for maintaining the pressure on the refrigerant delivered to said ejector substantially constant.

16. In a refrigerating apparatus, a refrigerating chamber, means for supplying refrigerant under pressure, means for storing a supply of refrigerant, pressure reducing means for admitting refrigerant directly from said supply means into the refrigerant storage means, an ejector nozzle operable by refrigerant flowing from the means supplying refrigerant under pressure to withdraw refrigerant from the stored supply and deliver it to the refrigerating chamber, means permitting return of refrigerant from the refrigerating chamber to the supply when the refrigerating action in said chamber is to be interrupted, and means for maintaining substantially constant the pressure on the refrigerant delivered to said ejector from the means supplying refrigerant under pressure.

17. In a refrigerating apparatus, a refrigerating chamber, means for supplying refrigerant under pressure, means for storing a supply of said refrigerant, pressure reducing means for admitting the refrigerant directly from said supply means into the refrigerant storage means, an ejector in said refrigerant storage means and including a throat having a restricted part and a nozzle discharging into said throat adjacent the restricted part thereof, said throat having an opening therein through which refrigerant may pass from the stored supply thereof into the throat, means including an automatic pressure regulator through which refrigerant from the supply thereof under pressure may pass to thereby effect operation of said ejector and withdrawal of refrigerant from the stored supply thereof, and means leading to the refrigerating chamber for directing refrigerant from said ejector into the refrigerating chamber.

18. A refrigerating apparatus including a chamber to be refrigerated, and having an evaporator passage, a volatile refrigerant storage accumulator disposed at a lower elevation than said passage, and of greater total capacity than the latter, means for supplying refrigerant directly to said accumulator, a conduit connecting the said accumulator and the lowermost portion of said passage, an ejector nozzle within said conduit, means for delivering refrigerant to said nozzle under a pressure greater than that in the accumulator, means for maintaining the pressure on the refrigerant delivered to said nozzle substantially constant and independent of fluctuations in the pressure of the source of supply, said conduit having an opening below the liquid level to permit upflow of refrigerant from said accumulator through said conduit under the action of said ejector nozzle and also permitting free, rapid and complete draining of the liquid refrigerant from said passage into said accumulator when said ejector nozzle is not in operation, and a passage connecting the upper portion of said first mentioned passage and said accumulator for the normal return of evaporated and surplus unevaporated refrigerant.

19. A refrigerating apparatus including a chamber to be refrigerated and having an evaporator passage, a volatile refrigerant storage chamber disposed directly beneath and closely adjacent to said passage, and of greater total capacity than the latter, a vertical conduit extending from the bottom of said passage downwardly through the top of the storage chamber to a point below the normal liquid level therein, an ejector nozzle at the lower end of said pipe, for inducing upward flow of refrigerant from said storage chamber through said pipe into said passage, means for delivering refrigerant to said ejector nozzle under substantially constant pressure and independent of fluctuations in the pressure of the source of supply, and a separate conduit connecting the upper portion of said passage and the upper portion of said storage chamber.

20. A refrigerating apparatus including a chamber through which material to be refrigerated may be passed, a refrigerant passage associated with said chamber, a refrigerant storage vessel disposed at a lower elevation than said passage, a conduit connecting the lower portion of said vessel with said passage, an ejector nozzle within said conduit and below the normal liquid level in said vessel for forcing liquid refrigerant from said vessel upwardly into said passage, means for maintaining the pressure of the refrigerant delivered to said nozzle substantially constant, and a passage connecting the upper portion of said first mentioned passage and the upper portion of said vessel, whereby refrigerant may be delivered upwardly from said vessel and through said first mentioned passage and may return to said vessel through said second mentioned passage, and whereby refrigerant in said first mentioned passage may completely drain into said vessel when refrigerant is not being forced from the vessel into the first mentioned passage by said ejector.

21. A refrigerating apparatus including a chamber to be refrigerated, and having an evaporator passage, a volatile refrigerant storage accumulator disposed at a lower elevation than said passage and of greater total capacity than the latter, means for supplying refrigerant to said accumulator, a conduit connecting the said accumulator and the lowermost portion of said passage, an ejector nozzle within said conduit, means for delivering refrigerant to said nozzle under a pressure greater than that in the accumulator, said conduit having an opening below the liquid level to permit upflow of refrigerant from said accumulator through said conduit under the action of said ejector nozzle, whereby when said ejector nozzle is not in operation the liquid refrigerant may freely drain from said passage into said accumulator, a passage connecting the upper portion of said first mentioned passage and said accumulator for the normal return of evaporated and surplus unevaporated refrigerant, and means for controlling the rate of delivery of the refrigerant through said nozzle and maintaining the pressure substantially constant independent of the pressure on the source of supply to said nozzle or the pressure in said accumulator.

22. A refrigerating apparatus including a chamber to be refrigerated and having an evaporator passage, a volatile refrigerant storage chamber disposed directly beneath and closely adjacent to said passage, a vertical conduit extending from the bottom of said passage downwardly through the top of the accumulator to a point below the normal liquid level therein, a nozzle within said accumulator at the lower end of said pipe, and means for delivering refrigerant under a substantially uniform pressure to said nozzle for inducing upward flow of the refrigerant from said accumulator through said pipe into said passage.

23. A refrigerating apparatus including a chamber to be refrigerated, having a pair of concentric casings encircling the same and communicating with each other at the top, a refrigerant supply vessel disposed below said chamber, a conduit connecting the lower portion of said supply vessel to the bottom of the inner casing, an ejector for forcing liquid upwardly through said conduit, an automatic pressure regulator for controlling the pressure on the fluid delivered to said ejector, and a return conduit connecting the bottom of the outer casing and the upper part of the supply vessel.

24. A refrigerating apparatus including a chamber to be refrigerated, having a pair of concentric casings encircling the same and communicating with each other at the top, a refrigerant supply vessel disposed below said chamber, a conduit connecting the lower portion of said supply vessel to the bottom of the inner casing, an ejector for forcing liquid upwardly through said conduit, an automatic pressure regulator for controlling the pressure on the fluid delivered to said ejector, a return conduit connecting the bottom of the outer casing and the upper part of the supply vessel, and a valve in said first mentioned conduit operable to prevent upflow through said conduit or permit drainage from the bottom of the inner casing to the supply vessel.

ARTHUR H. BOILEAU.
ALBERT L. VOGGENTHALER.